United States Patent
Piatt et al.

(10) Patent No.: US 11,482,968 B2
(45) Date of Patent: *Oct. 25, 2022

(54) SYSTEMS AND METHODS FOR IMPROVED BIFACIAL SOLAR MODELING

(71) Applicant: 8me Nova, LLC, San Francisco, CA (US)

(72) Inventors: Clayton Gregory Piatt, Berkeley, CA (US); Tirumalai Tejas, San Francisco, CA (US)

(73) Assignee: 8ME NOVA, LLC, San Francisco, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/344,728

(22) Filed: Jun. 10, 2021

(65) Prior Publication Data

US 2022/0311380 A1    Sep. 29, 2022

Related U.S. Application Data

(63) Continuation of application No. 17/211,179, filed on Mar. 24, 2021, now Pat. No. 11,063,556.

(51) Int. Cl.
*H02S 50/10* (2014.01)
*H02J 3/00* (2006.01)
*H02S 20/21* (2014.01)

(52) U.S. Cl.
CPC .............. *H02S 50/10* (2014.12); *H02J 3/004* (2020.01); *H02J 2300/24* (2020.01); *H02S 20/21* (2014.12)

(58) Field of Classification Search
CPC .......... H02S 50/10; H02S 20/21; H02J 3/004; H02J 2300/24
See application file for complete search history.

(56) References Cited

U.S. PATENT DOCUMENTS

| | | |
|---|---|---|
| 10,192,009 B2 | 1/2019 | Goverde et al. |
| 10,666,187 B2 | 5/2020 | Williamson |
| 11,063,556 B1 | 7/2021 | Piatt et al. |

(Continued)

OTHER PUBLICATIONS

U.S. Appl. No. 17/211,179 Notice of Allowance dated May 12, 2021.

*Primary Examiner* — Toan T Vu
*Assistant Examiner* — Thai H Tran
(74) *Attorney, Agent, or Firm* — Foley & Lardner LLP

(57) ABSTRACT

The present disclosure provides systems and methods for improved bifacial solar modeling. A method may comprise measuring an albedo of a surface on which an array of bifacial solar modules is disposed and setting an albedo parameter of a bifacial gain model. The method may further comprise measuring a backside irradiance of the array and setting a backside irradiance parameter. The method may further comprise setting a shed transparency parameter using the measured backside irradiance and a geometric model of the array. The method may further comprise setting a rear shading parameter using a shading model of the array. The method may further comprise computing an expected bifacial gain of the array. The method may further comprise determining an actual bifacial gain of the array. The method may further comprise setting a rear mismatch parameter to minimize a loss function of the expected bifacial gain and the actual bifacial gain.

19 Claims, 5 Drawing Sheets

(56) References Cited

U.S. PATENT DOCUMENTS

| | | | |
|---|---|---|---|
| 2001/0008144 A1* | 7/2001 | Uematsu | H01L 31/0236 |
| | | | 136/246 |
| 2007/0017567 A1* | 1/2007 | Gronet | H01L 31/0749 |
| | | | 136/246 |
| 2008/0302418 A1 | 12/2008 | Buller et al. | |
| 2016/0020351 A1* | 1/2016 | Castillo-Aguilella | ................ |
| | | | H01L 31/0684 |
| | | | 136/251 |
| 2019/0190445 A1 | 6/2019 | Alderman et al. | |
| 2022/0115551 A1* | 4/2022 | Kostuk | H02S 40/22 |

* cited by examiner

SYSTEMS AND METHODS FOR IMPROVED BIFACIAL SOLAR MODELING

CROSS-REFERENCE

This application is a continuation of U.S. patent application Ser. No. 17/211,179, filed Mar. 24, 2021, which is entirely incorporated herein by reference.

BACKGROUND

Bifacial solar modules are double-sided solar modules that capture direct sunlight and sunlight reflected off the ground. Bifacial solar modules provide improved performance over monofacial solar modules and produce more power than monofacial modules. However, the performance gain is affected by multiple factors. The total performance gain from bifacial modules is generally less than 10%, making precise measurement of these performance increases challenging to measure precisely.

SUMMARY

The present disclosure provides systems and methods for determining the bifacial gain of a bifacial solar module array. In some embodiments of the present disclosure, a system can measure an albedo of a surface on which the bifacial solar modules are disposed and set an albedo parameter of a bifacial gain model in accordance with the measured albedo. The albedo parameter may represent the reflectivity of the surface on which the bifacial solar module array is disposed. The system can measure a backside irradiance of the array and set a backside irradiance parameter in accordance with the measured backside irradiance. The backside irradiance may represent the amount of solar power the back sides of the bifacial solar modules receive after light reflects off the surface on which the bifacial solar modules are disposed. The system can determine and set a shed transparency parameter using the measured backside irradiance and a geometric model of the array of bifacial solar modules. The shed transparency parameter may account for a variety of conditions that may affect the amount of light absorbed by the back sides of the bifacial solar modules. The system can determine and set a rear shading parameter. The rear shading parameter may take into account the possible shading of the back side of a bifacial solar module due to the module mounting structure, module cabling, or any other obstacles that stand between the back side of the bifacial modules and the reflected light. The system can use the aforementioned parameters to compute an expected bifacial gain of the array of bifacial solar modules. The system can determine an actual bifacial gain of the array of bifacial solar modules. The system can set a rear mismatch and/or monofacial power parameter that minimizes a loss function of the expected bifacial gain and the actual bifacial gain, to further improve the performance of the bifacial gain model.

The system described above provides several improvements to the technical field of solar power prediction and management. The system determines the parameters of a bifacial gain model from experimental data rather than theory, providing more accurate predictions of an expected bifacial gain. The system can also calculate an actual bifacial gain in the absence of a monofacial solar module power output. The increased accuracy in the calculation of expected bifacial gains provides increased confidence in modeling the potential energy production of a bifacial solar module array. This may allow a solar power plant to account for predicted changes in power output, e.g., by supplementing solar power output with power from an energy storage system, or charging the energy storage system if solar power output is expected to exceed demand.

In an aspect, the present disclosure provides for a method for training a bifacial gain model to predict a bifacial gain of an array of bifacial solar modules, wherein the bifacial gain model comprises at least an albedo parameter, a backside irradiance parameter, a shed transparency parameter, a rear shading parameter, and a rear mismatch parameter, the method comprising: (a) measuring an albedo of a surface on which the array of bifacial solar modules is disposed and setting the albedo parameter in accordance with the measured albedo; (b) measuring backside irradiance of the array of bifacial solar modules and setting the backside irradiance parameter in accordance with the measured backside irradiance; (c) determining and setting the shed transparency parameter using the measured backside irradiance and a geometric model of the array of bifacial solar modules; (d) determining and setting the rear shading parameter using a shading model of the array of bifacial solar modules; (e) subsequent to (a)-(d), computing, using the bifacial gain model, an expected bifacial gain of the array of bifacial solar modules; (f) determining an actual bifacial gain of the array of bifacial solar modules; and (g) setting the rear mismatch parameter to minimize an output of a loss function of the expected bifacial gain and the actual bifacial gain. In some embodiments, the method further comprises adjusting the albedo parameter based on the measured back side irradiance of the array of bifacial solar modules. In some embodiments, step (c) comprises determining road effects and gap effects on the array of bifacial solar modules by determining a variance of the measured backside irradiance over the array of bifacial solar modules. In some embodiments, the method further comprises determining an average excess backside irradiance of the array of bifacial solar modules due to the road effects and the gap effects. In some embodiments, the method further comprises an average excess backside irradiance of the array of bifacial solar modules due to the road effects and the gap effects. In some embodiments, the actual bifacial gain is a ratio of bifacial solar module power output over monofacial solar module power output. In some embodiments, step (f) comprises measuring the actual bifacial gain in a variety of weather and lighting conditions to generate a plurality of data points. In some embodiments, the method further comprises applying a filter to the plurality of data points to exclude erroneous data points. In some embodiments, the rear mismatch parameter minimizes a loss function of the expected bifacial gain and the actual bifacial gain across the plurality of data points. In some embodiments, the bifacial gain model further comprises a monofacial power parameter, and wherein the method further comprises (g) setting the monofacial power parameter to minimize a loss function of the expected bifacial gain and the actual bifacial gain. In some embodiments, the loss function is a mean squared error loss function. In some embodiments, the loss function is a mean squared logarithmic error loss function or a mean absolute error loss function.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

BACKGROUND

Bifacial solar modules are double-sided solar modules that capture direct sunlight and sunlight reflected off the ground. The gain of a bifacial solar module is defined as a ratio of bifacial module power output to monofacial module power output. Bifacial gain models may predict the gain of a bifacial solar module compared to a similarly situated monofacial solar module. A bifacial gain model may allow a user to accurately analyze different configurations of a bifacial solar module array and predict a bifacial gain for the array in each configuration.

The bifacial gain model may use input design parameters configured to model a projected bifacial solar module array. The model may use the parameters to determine a projected bifacial gain for the bifacial solar module array.

One example of a bifacial gain model is the PVSyst bifacial gain model of PVSyst. Other examples include the bifacial gain model of PVPerformance and Purdue University Bifacial Module Calculator.

Figure 1:
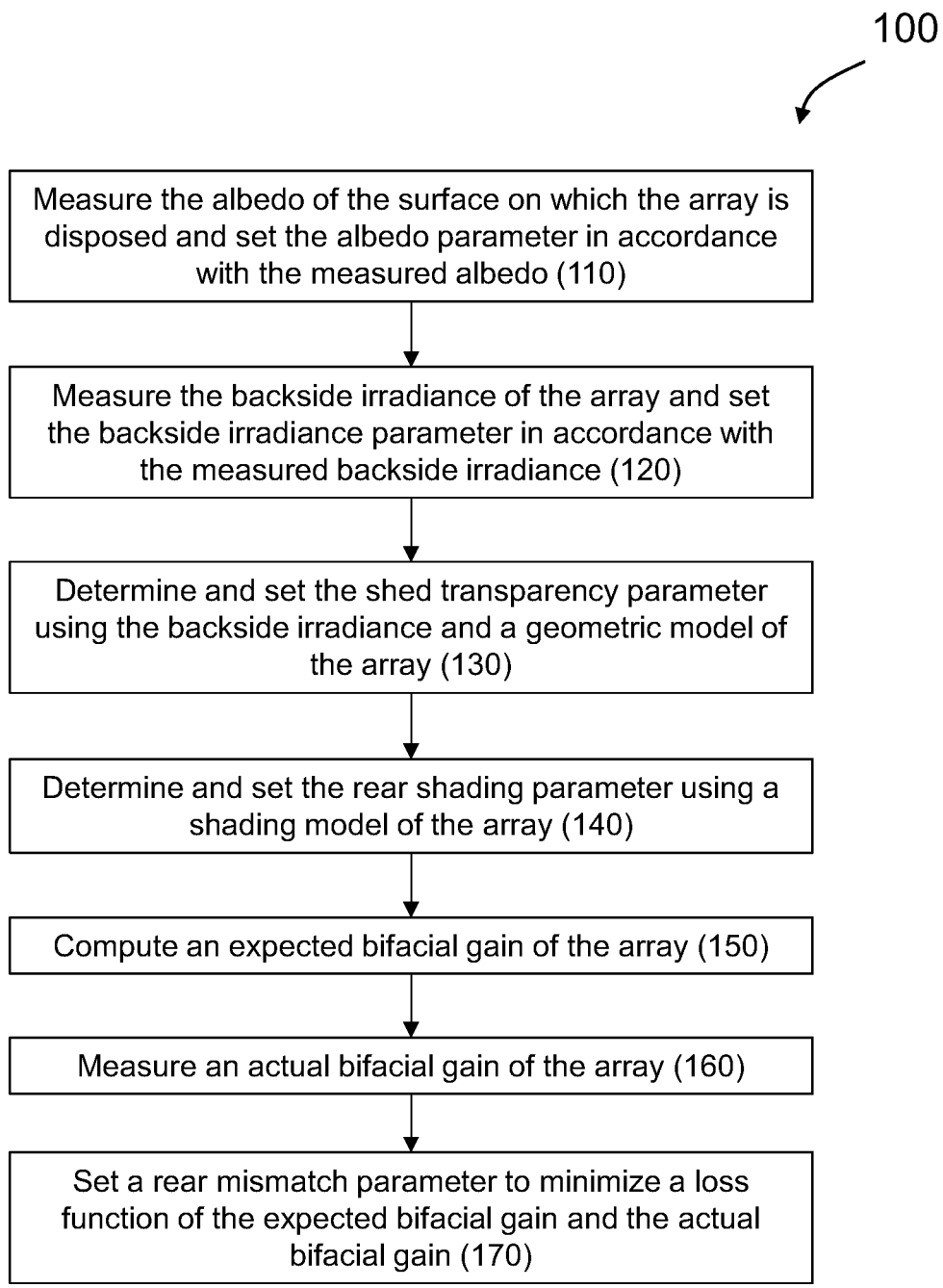
FIG. 1 is a flow chart of a process for training a bifacial gain model to predict a bifacial gain of an array of bifacial solar modules, according to some embodiments of the present disclosure.

FIG. 1 is a flow chart of a process 100 for training a bifacial gain model to predict a bifacial gain of an array of bifacial solar modules, according to some embodiments of the present disclosure. The process 100 can be performed by a system of one or more appropriately programmed computers in one or more locations. For example, the process can be performed by the computer systems described below in FIG. 3. The bifacial gain model may use one or more parameters as discussed herein to predict the bifacial gain of an array of bifacial solar modules.

The system can measure an albedo of a surface on which the array of bifacial solar modules is disposed and set an albedo parameter of the bifacial gain model in accordance with the measured albedo (110). The albedo may represent the reflectivity of the surface on which the array of bifacial solar modules is disposed. The system can measure the albedo using an albedometer, pyranometer, or other related device that can sufficiently measure the reflectivity of the surface on which the array of bifacial solar modules is disposed. The system can set an albedo parameter of the bifacial gain model in accordance with the measured albedo of the surface.

The system can measure a backside irradiance of the array of bifacial solar modules and set a backside irradiance parameter of the bifacial gain model in accordance with the measured backside irradiance (120). The backside irradiance may represent the amount of solar power the back sides of the bifacial solar modules receive after light reflects off the surface on which the bifacial solar modules are disposed. The system can measure the backside irradiance using irradiance sensors. The irradiance sensors can be positioned in such a way that they are illuminated by the light falling on the back sides of the bifacial solar modules. The irradiance sensors can gather data with which the system can calculate a measured backside irradiance. The system can apply a data filter to the gathered irradiance data to exclude any erroneous data. Erroneous data may be data that falls outside of what is acceptable and should be rejected by the system. For example, erroneous data may include data points measured as zero during the daytime. The system can use the measured backside irradiance to set the backside irradiance parameter of the bifacial gain model.

The measured backside irradiance can vary due to monthly deviations in solar activity and other varying lighting, temperature, and weather conditions. The system can adjust the albedo parameter of the bifacial gain model based on the variations in the measured backside irradiance as the lighting, temperature, and weather conditions change.

The system can determine and set a shed transparency parameter of the bifacial gain model using the measured backside irradiance and a geometric model of the array of bifacial solar modules (130). The shed transparency parameter accounts for a variety of conditions that may affect the amount of light absorbed by the back sides of the bifacial solar modules. For example, the shed transparency parameter may account for the degree to which illumination is direct versus scattered, inter-row spacing of the bifacial solar modules, and the presence of gaps between bifacial modules along a row of bifacial modules to allow for drive mechanisms and/or an access road. The geometric model may be a ray tracing three-dimensional model of the array of bifacial solar modules. The geometric model may also be a surface model or a solid model of the array of bifacial solar modules.

Figure 2A:
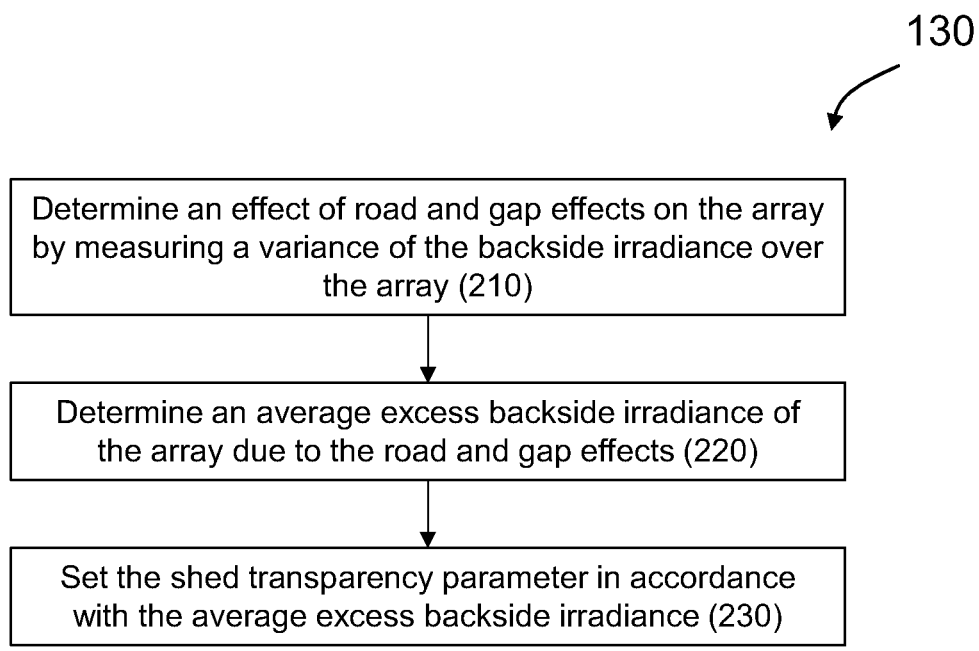
FIG. 2A is a flow chart of a process for setting a shed transparency parameter, according to some embodiments of the present disclosure.
Figure 2B:
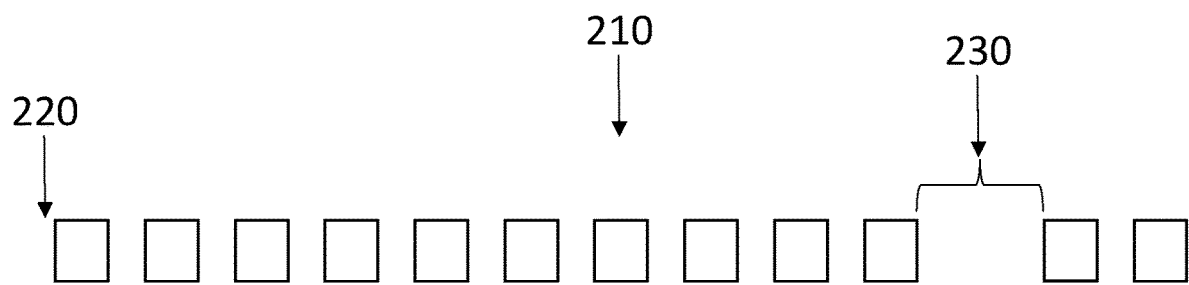
FIG. 2B illustrates a row of bifacial solar modules in an array of bifacial solar modules, according to some embodiments of the present disclosure.
Figure 2C:
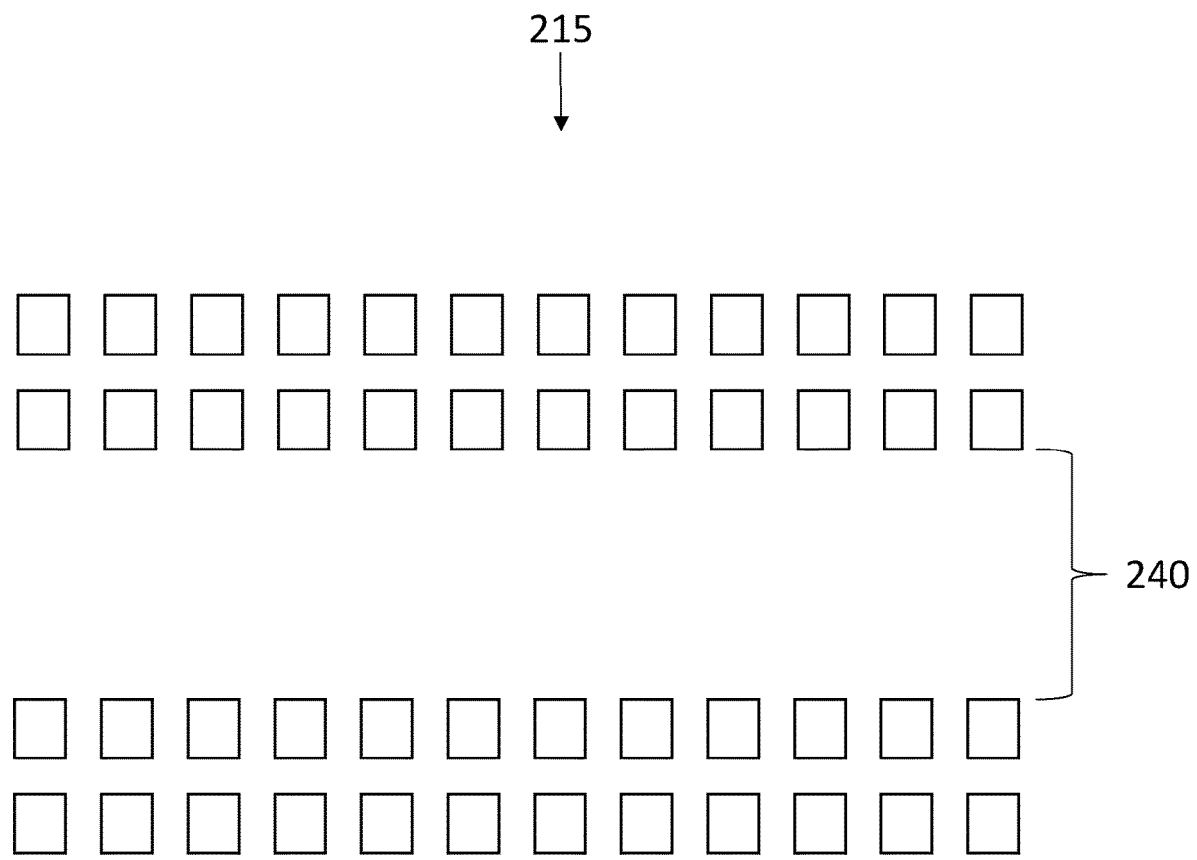
FIG. 2C illustrates a section of bifacial solar modules in an array of bifacial solar modules, according to some embodiments of the present disclosure.

FIG. 2A illustrates a flowchart of a process (130) the system can use to determine and set the shed transparency parameter of the bifacial gain model, according to some embodiments of the present disclosure. The system can determine an effect of road and gap effects on the array of bifacial solar modules by measuring a variance of the backside irradiance over the array of bifacial solar modules. This process is illustrated in FIGS. 2B-2C. For example, in FIG. 2B, the backside irradiance of bifacial solar modules may vary across a row 210 of bifacial solar modules. For example, the measured backside irradiance for a bifacial solar module may be higher at an end 220 of a row 210 of bifacial solar modules and may slightly decrease as the measurements are taken for bifacial modules away from the end 220 and closer to the middle of the row 210 of bifacial solar modules. The backside irradiance may be higher at an end 220 because there are less obstacles obstructing the reflected light from reaching the back side of the bifacial solar module. As the measurements are taken toward the middle of the row 210, the measured backside irradiance may reach a steady value.

FIG. 2B also illustrates areas in an array of bifacial solar modules that include a gap 230. The gap 230 can cause variations in the measured backside irradiance. Similar to the effects on backside irradiance of an end 220 of a row, the backside irradiance measured for bifacial solar modules may be higher for bifacial modules adjacent to the gap 230 and may decrease as the backside irradiance is measured for bifacial modules further away from the gap. The measured backside irradiance may reach a steady value as the measurements are taken while moving away from the gap 230.

FIG. 2C illustrates a section 215 of an array of bifacial solar modules that includes an access road 240. The access road 240 may provide access to vehicles for the maintenance and upkeep of the bifacial solar array. The gap created by the access road 240 can cause variations in the measured backside irradiance for bifacial modules in the section 215. For example, the measured backside irradiance for bifacial modules in the section 215 may be higher than the backside irradiance measured for bifacial modules further away from the access road 240.

Returning to FIG. 2A, the system can use the measured backside irradiance data and the geometric model of the array of bifacial solar models to determine an average excess backside irradiance of the array due to the road and gap effects (220).

The system can set the shed transparency parameter of the bifacial gain model in accordance with the average excess backside irradiance (230). The average excess backside irradiance allows the system to more accurately model the backside irradiance of the entire array of bifacial solar modules.

Returning the FIG. 1, the system can determine and set the rear shading parameter of the bifacial gain model using a shading model of the array (140). The rear shading parameter can take into account the possible shading of the back side of a bifacial solar module due to the module mounting structure, module cabling, or any other obstacles that stand between the back side of the bifacial modules and the reflected light. This parameter may help to more accurately model the total amount of light absorbed by the back sides of the bifacial solar modules.

The system can perform operations (110)-(140) under a variety of lighting, temperature, weather, and timing conditions. The varying lighting conditions can include, for example, varying lighting conditions at different times of the day, different times of the year, and during times of varying direct and scattered light. The varying temperature conditions can include, for example, varying temperatures throughout a day and throughout a year. The varying weather conditions can include, for example, the variety of weather conditions the bifacial solar array is expected to experience in its particular location. This may include data gathered during varying cloud patterns throughout a given day, or data gathered throughout the different seasons of a year. The timing conditions can include different periods of time. For example, the system can compute the expected bifacial gain by the minute, by the hour, by the day, by the week, by the month, or by the year.

Subsequent to steps (110)-(140), the system can compute, using the bifacial gain model, an expected bifacial gain of the array of bifacial solar modules (150). The bifacial gain model may use the set albedo, backside irradiance, shed transparency, and rear shading parameters to compute the expected bifacial gain.

The system can determine an actual bifacial gain of the array of bifacial solar modules (160). The actual bifacial gain may be a ratio of bifacial solar module power output over monofacial solar module power output. The actual bifacial gain can be determined from gathered experimental data comprising a plurality of data points. The experimental data can comprise a plurality of data points covering a variety of lighting, temperature, weather, and timing conditions. The varying lighting conditions can include, for example, data gathered at different times of the day, different times of the year, and during times of varying direct and scattered light. The varying temperature conditions can include, for example, data gathered for the varying temperatures throughout a day and throughout a year. The varying weather conditions can include, for example, data gathered over the variety of weather conditions the bifacial solar array is expected to experience in its particular location. This may include data gathered during varying cloud patterns throughout a given day, or data gathered throughout the different seasons of a year. The timing conditions can include data gathered over set periods of time. For example, the data may be gathered by the minute, by the hour, by the day, by the week, by the month, or by the year. The system can apply a filter to the gathered experimental data to exclude erroneous data points.

The system can use the gathered experimental data to determine a bifacial solar module power output over the variety of lighting, temperature, weather, and timing conditions. The system can then compare the bifacial solar module power output over these varying conditions to a monofacial solar module power output. The system can determine the monofacial solar module power output by using an identical model to the bifacial solar array, but accounting for the back sides of the solar modules being covered to prevent backside energy production. The system uses the comparison of the bifacial solar module power output over the monofacial solar module power output over the varying conditions to determine a bifacial gain of the bifacial solar array for the varying conditions.

The system can set a rear mismatch parameter of the bifacial gain model to minimize an output of a loss function of the expected bifacial gain and the actual bifacial gain (170). The rear mismatch parameter accounts for the difference between the expected bifacial gain and the actual bifacial gain. The loss function may be any loss function configured to measure a difference between the expected bifacial gain and the actual bifacial gain. For example, the loss function may be a mean squared error loss function, a mean squared logarithmic error loss function, a mean absolute error loss function, or any other similar loss function.

The bifacial gain model may also include a monofacial power parameter used to minimize the loss function of the expected bifacial gain and the actual bifacial gain. The monofacial power parameter may be the nominal power rating of the baseline monofacial module (e.g., as set by the manufacturer). The system can set the monofacial power parameter alongside the rear mismatch parameter to minimize the loss function. The system need only set the rear mismatch parameter to minimize the loss function in scenarios in which a monofacial solar module power output is available at operation (160) to determine an actual bifacial gain. The system can use the monofacial power parameter in addition to the rear mismatch parameter in scenarios where a monofacial solar module power output is not available at operation (160).

Computer Systems

Figure 3:
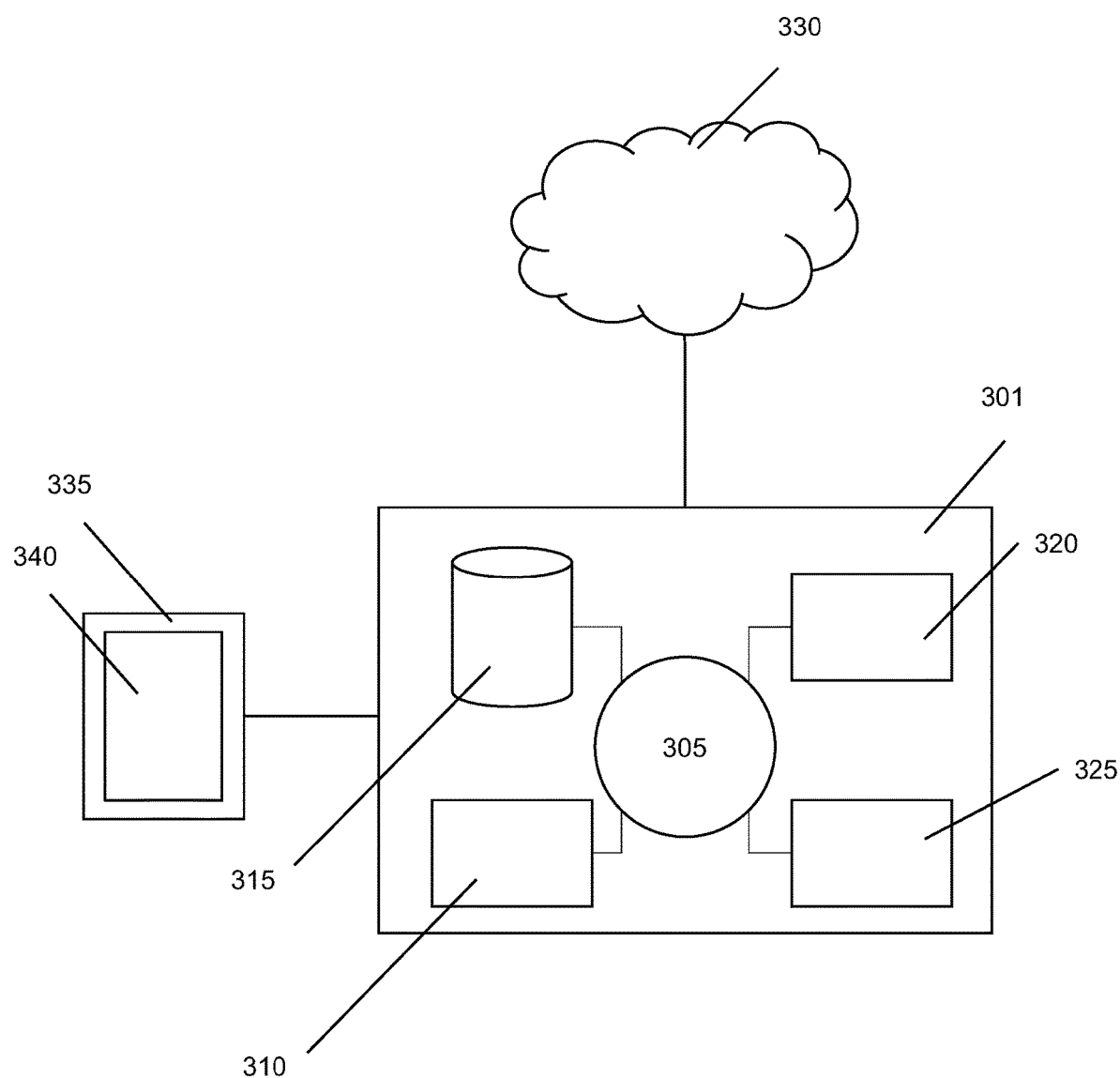
FIG. 3 shows a computer system that is programmed or otherwise configured to implement systems and methods provided herein.

The present disclosure provides computer systems that are programmed to implement methods of the disclosure. FIG. 3 shows a computer system 301 that is programmed or otherwise configured to implement the process 100 of FIG. 1. The computer system 301 can be an electronic device of a user or a computer system that is remotely located with respect to the electronic device. The electronic device can be a mobile electronic device.

The computer system 301 includes a central processing unit (CPU, also "processor" and "computer processor" herein) 305, which can be a single core or multi core processor, or a plurality of processors for parallel processing. The computer system 301 also includes memory or memory location 310 (e.g., random-access memory, read-only memory, flash memory), electronic storage unit 315 (e.g., hard disk), communication interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communication bus (solid lines), such as a motherboard. The storage unit 315 can be a data storage unit (or data repository) for storing data. The computer system 301 can be operatively coupled to a computer network ("network") 330 with the aid of the communication interface 320. The network 330 can be the Internet, an internet and/or extranet, or an intranet and/or extranet that is in communication with the Internet. The network 330 in some cases is a telecommunication and/or data network. The network 330 can include one or more computer servers, which can enable distributed computing, such as cloud computing. The network 330, in some cases with the aid of the computer system 301, can implement a peer-to-peer network, which may enable devices coupled to the computer system 301 to behave as a client or a server.

The CPU 305 can execute a sequence of machine-readable instructions, which can be embodied in a program or software. The instructions may be stored in a memory location, such as the memory 310. The instructions can be directed to the CPU 305, which can subsequently program or otherwise configure the CPU 305 to implement methods of the present disclosure. Examples of operations performed by the CPU 305 can include fetch, decode, execute, and writeback.

The CPU 305 can be part of a circuit, such as an integrated circuit. One or more other components of the system 301 can be included in the circuit. In some cases, the circuit is an application specific integrated circuit (ASIC).

The storage unit 315 can store files, such as drivers, libraries and saved programs. The storage unit 315 can store user data, e.g., user preferences and user programs. The computer system 301 in some cases can include one or more additional data storage units that are external to the computer system 301, such as located on a remote server that is in communication with the computer system 301 through an intranet or the Internet.

The computer system 301 can communicate with one or more remote computer systems through the network 330. For instance, the computer system 301 can communicate with a remote computer system of a user (e.g., a database, an enterprise or extrapise system, an Internet-of-Things (IoT) device, a sensor, or the like). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 301 via the network 330.

Methods as described herein can be implemented by way of machine (e.g., computer processor) executable code stored on an electronic storage location of the computer system 301, such as, for example, on the memory 310 or electronic storage unit 315. The machine executable or machine readable code can be provided in the form of software. During use, the code can be executed by the processor 305. In some cases, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 301 can include or be in communication with an electronic display 335 that comprises a user interface (UI) 340 for providing, for example, a graphical representation of the bifacial solar module array. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 305. The algorithm can, for example, set one or more of the parameters discussed herein, including the albedo, backside irradiance, shed transparency, rear shading, rear mismatch, and monofacial power parameters.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A non-transitory computer-readable media comprising computer-readable instructions stored thereon that when executed by a processor cause the processor to perform a process comprising:
    providing a bifacial gain model having:
        a backside irradiance parameter, wherein the backside irradiance parameter is set in accordance with a measured backside irradiance of an array of bifacial solar modules,
        a rear shading parameter, wherein the rear shading parameter is set using a shading model of the array of bifacial solar modules, and
        a rear mismatch parameter, wherein the rear mismatch parameter is configured to reduce a loss function between a plurality of bifacial gain output values of the bifacial gain model and a plurality of bifacial gain measurements of the array of bifacial solar modules; and
    generating a predicted bifacial gain of the array of bifacial solar modules based at least partially on the bifacial gain model, the backside irradiance parameter, and the rear shading parameter.

2. The non-transitory computer-readable medium of claim 1, wherein the loss function is mean-squared error.

3. The non-transitory computer-readable medium of claim 1, wherein the plurality of bifacial gain measurements were taken in a variety of weather conditions, temperatures, seasons, lighting conditions, or any combination thereof.

4. The non-transitory computer-readable medium of claim 1, wherein each bifacial gain measurement in the plurality of bifacial gain measurements is a ratio of bifacial solar module power output over monofacial solar module power output.

5. The non-transitory computer-readable medium of claim 1, the bifacial gain model further having a monofacial power parameter configured to reduce the loss function in combination with the rear mismatch parameter.

6. The non-transitory computer-readable medium of claim 1, wherein the rear shading parameter is based at least partially on one or more obstacles between a light source and a back side of at least one bifacial solar module in the plurality of solar modules.

7. A system comprising one or more processors configured to:
provide a bifacial gain model (BGM), wherein the BGM comprises:
a backside irradiance parameter, wherein the backside irradiance parameter is set in accordance with a measured backside irradiance of an array of bifacial solar modules,
a rear shading parameter, wherein the rear shading parameter is set using a shading model of the array of bifacial solar modules, and
a rear mismatch parameter, wherein the rear mismatch parameter is configured to reduce a loss function between a plurality of bifacial gain output values of the BGM and a plurality of bifacial gain measurements of the array of bifacial solar modules; and
generate a predicted bifacial gain of the array of bifacial solar modules based at least partially on the BGM, the backside irradiance parameter, and the rear shading parameter.

8. The system of claim 7, wherein the loss function is mean-squared error.

9. The system of claim 7, wherein the plurality of bifacial gain measurements were taken in a variety of weather conditions, temperatures, seasons, lighting conditions, or any combination thereof.

10. The system of claim 7, wherein each bifacial gain measurement in the plurality of bifacial gain measurements is a ratio of bifacial solar module power output over monofacial solar module power output.

11. The system of claim 7, wherein the rear shading parameter is based at least partially on one or more obstacles between a light source and a back side of at least one bifacial solar module in the plurality of solar modules.

12. A non-transitory computer-readable media comprising computer-readable instructions stored thereon that when executed by a processor cause the processor to perform a process comprising:
providing a bifacial gain model having:
a backside irradiance parameter, wherein the backside irradiance parameter is set in accordance with a measured backside irradiance of an array of bifacial solar modules, and
a shed transparency parameter, wherein the shed transparency parameter is set in accordance with the measured backside irradiance and a geometric model of the array of bifacial solar modules; and
generating a predicted bifacial gain of the array of bifacial solar modules based at least partially on the bifacial gain model, the backside irradiance parameter, and the shed transparency parameter.

13. The non-transitory computer-readable medium of claim 12, wherein the plurality of bifacial gain measurements is based at least partially on road effects on the array of bifacial solar modules.

14. The non-transitory computer-readable medium of claim 12, wherein the shed transparency parameter is based at least partially on gap effects on the array of bifacial solar modules.

15. The non-transitory computer-readable medium of claim 12, wherein the shed transparency parameter is based at least partially on a mean measured backside irradiance of the array of bifacial solar modules.

16. A system comprising one or more processors configured to:
provide a bifacial gain model (BGM), wherein the BGM comprises:
a backside irradiance parameter, wherein the backside irradiance parameter is set in accordance with a measured backside irradiance of an array of bifacial solar modules, and
a shed transparency parameter, wherein the shed transparency parameter is set in accordance with the measured backside irradiance and a geometric model of the array of bifacial solar modules; and
generate a predicted bifacial gain of the array of bifacial solar modules based at least partially on the BGM, the backside irradiance parameter, and the shed transparency parameter.

17. The system of claim 16, wherein the plurality of bifacial gain measurements is based at least partially on road effects on the array of bifacial solar modules.

18. The system of claim 16, wherein the shed transparency parameter is based at least partially on gap effects on the array of bifacial solar modules.

19. The system of claim 16, wherein the shed transparency parameter is based at least partially on a mean measured backside irradiance of the array of bifacial solar modules.

* * * * *